April 30, 1935.  E. SHARPE  1,999,917
CULTIVATOR IMPLEMENT ATTACHMENT
Filed June 21, 1934
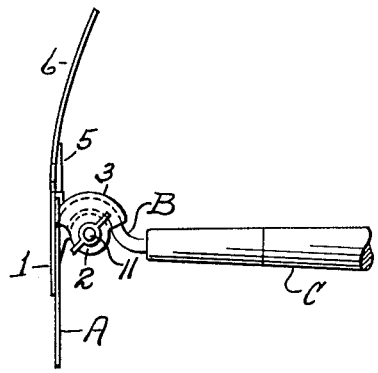
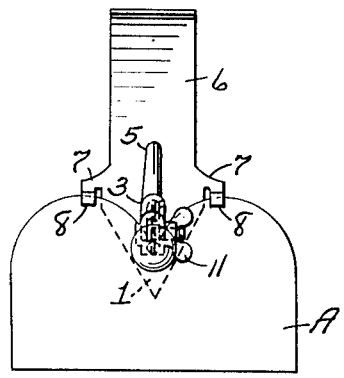
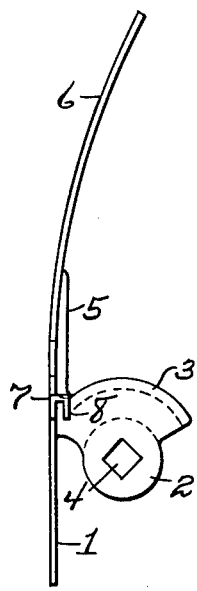
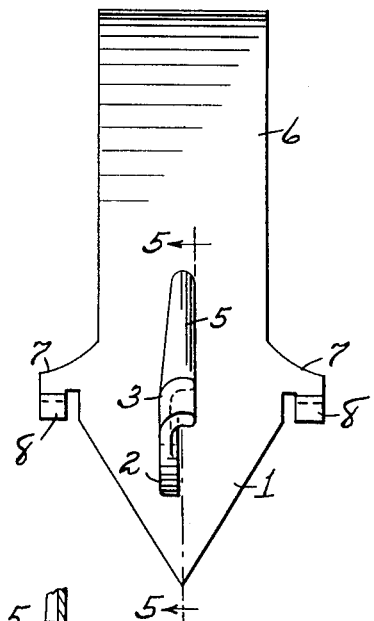
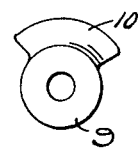
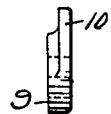
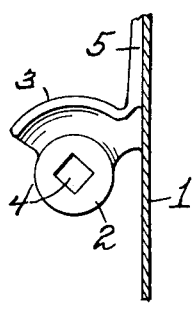
Elmer Sharpe
INVENTOR
BY Victor J. Evans & Co.
ATTORNEY Patented Apr. 30, 1935

1,999,917

UNITED STATES PATENT OFFICE 1,999,917

CULTIVATOR IMPLEMENT ATTACHMENT

Elmer Sharpe, Detroit, Mich.

Application June 21, 1934, Serial No. 731,755

1 Claim. (Cl. 97—62)

This invention relates to garden implements and its general object is to provide an attachment that is primarily designed for use with a cultivating implement such as a hoe, to materially increase its cultivating qualities.

Another object of the invention is to provide an attachment for a cultivating implement, that can be associated therewith in an easy and expeditious manner, and without fear of casual removal or displacement.

A further object of the invention is to provide an attachment for a cultivating implement that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:

Figure 1 is a side view illustrating the application of my attachment to a hoe.

Figure 2 is a front view thereof.

Figure 3 is a side view of the attachment per se.

Figure 4 is a rear view of the attachment.

Figure 5 is a sectional view taken approximately on line 5—5 of Figure 4, looking in the direction of the arrows.

Figure 6 is a detail view of the detachable clamp portion.

Figure 7 is an edge view thereof.

Referring to the drawing in detail, it will be noted that I have illustrated my attachment as being associated with a hoe, but it can be secured to other garden implements such as a rake or the like. The hoe includes the usual blade A having formed therewith a shank B, the latter being fixed to a handle C, as clearly shown in Figure 1 of the drawing.

The attachment in the form as shown includes a body 1 that is substantially triangular in formation and has secured thereto a bracket member 2, the latter including a substantial disk like portion having formed thereon and following a portion of the curvature thereof, a transversely curved member 3. The disk like portion is provided with a square cornered opening 4 for a purpose which will be presently apparent.

Formed on the bracket member 2 and preferably with the transversely curved member is a rib 5 that acts as a reinforcing means for the body 1, as well as a relatively narrow elongated blade 6 which is formed on the body 1 and extends upwardly therefrom in curved formation.

The body 1 has laterally extending therefrom at the juncture thereof with the blade 6, arms 7 that have formed therewith right angle bent tongues 8 adapted to receive the upper edge of the blade A of the hoe as best shown in Figure 1.

Cooperating with the bracket member 2 is a companion member that includes a disk like portion 9 having formed therewith an ear 10 and is provided with a central opening. The ear 10 follows the curvature of the disk like portion 9 and cooperates with the transverse curved member 3 in setting up a clamping engagement with the shank B of the hoe as clearly shown in Figure 1, the disk like portions being held in association through the instrumentality of a bolt and nut connection 11 that passes through the openings, and the bolt is provided with a square cornered portion to be received in the square cornered opening 4 as will be apparent. It will be noted that the nut is of the wing type so that the attachment can be associated with the hoe without the use of tools.

From the above description and disclosure of the drawing, it will be obvious that I have provided an attachment for a garden implement that is held fixed thereto through the instrumentality of the tongues 8 and the clamping means, the latter including the disk like portions, the transversely curved member 3, the ear 10 and the bolt and nut connections. The blade 6 of the attachment is used for many purposes and is not only capable of use in digging deeply into the ground to loosen the sub-soil, but can be used for grooving and trenching, as well as to cultivate the soil in close association with plants and the like.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A cultivator implement attachment, comprising a body, a relatively narrow elongated blade formed on said body and extending therefrom in curved formation, arms extending laterally from the body and including tongues engageable with the ground penetrating means of the implement, clamping means cooperating with the tongues for securing the attachment to the implement with the blade disposed in opposed relation with respect to the ground penetrating means, said clamping means including a bracket secured to the body and having a curved member, a companion member including an ear, means for securing the companion member and bracket together with the curved member and ear in clamping association with the implement, and reinforcing means for the body and blade.

ELMER SHARPE.